Jan. 8, 1929.  F. V. WALTZ  1,697,942
WEIGHING SCALE
Filed Nov. 1, 1924
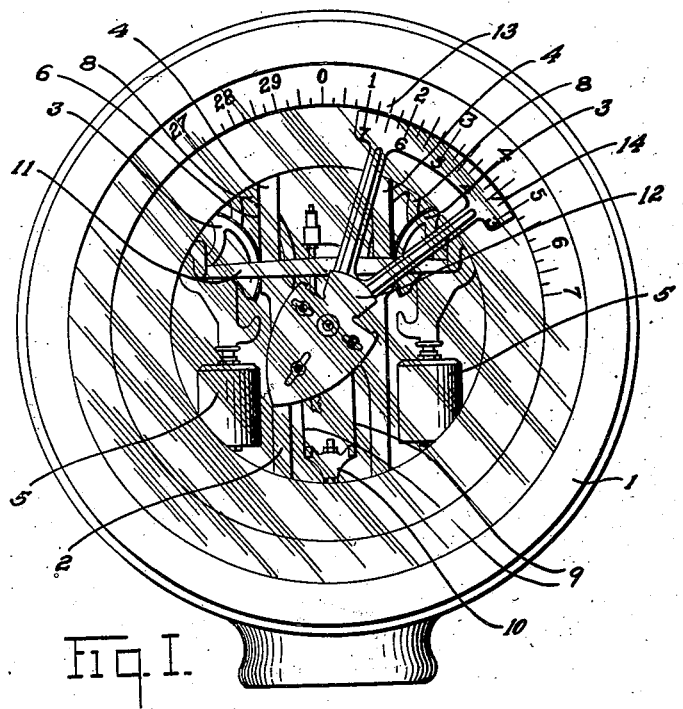
Fig. I.
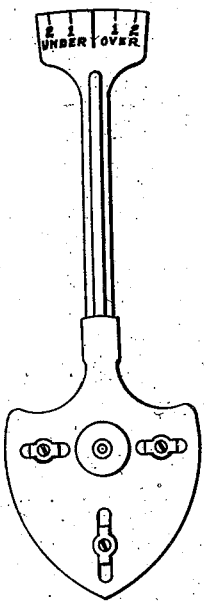
Fig. III.
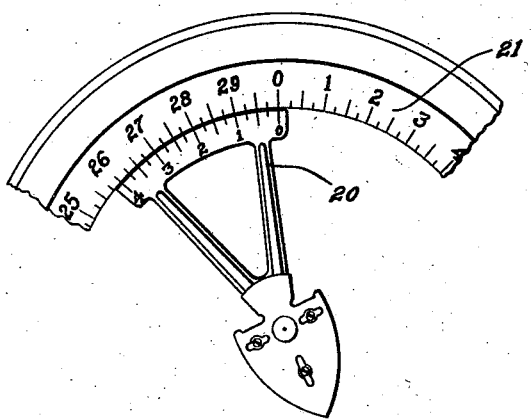
Fig. II.
Inventor
FOSTER V. WALTZ.
By C.V. Marshall,
Attorney Patented Jan. 8, 1929.

1,697,942

UNITED STATES PATENT OFFICE.

FOSTER V. WALTZ, OF ST. LOUIS, MISSOURI, ASSIGNOR TO TOLEDO SCALE COMPANY, OF TOLEDO, OHIO, A CORPORATION OF NEW JERSEY.

WEIGHING SCALE.

Application filed November 1, 1924. Serial No. 747,214.

This invention relates to indicating devices for weighing scales, and more particularly to devices employed in filling packages of varying tare and net weights.

When commodities are packed in containers ready for shipment, it is a requisite that the net weight be accurately determined. This is a very easy process when the containers are of uniform weight, but is a time-consuming operation if the containers are of varying weight. One of the principal objects of this invention is the provision of simple, efficient and inexpensive means of ascertaining the weight of the contents of containers of varying weight.

Another object of my invention is to provide means whereby containers of varying tare weight may be filled with a commodity, the contents being weighed in the container.

Another object of my invention is to provide mean for indicating the weight of the net contents of containers of varying tare weight in the filling of the containers with commodities of varying sizes.

Still another object is to provide an indicating means for indicating the net contents of containers of varying weight without shifting poises or otherwise adjusting the counterbalancing mechanism.

Other objects and advantages will be apparent from the following description, in which reference is had to the accompanying drawings illustrating preferred embodiments of my invention and wherein similar reference numerals designate similar parts throughout the several views.

In the drawings:—

Figure I is an elevational view of load-counterbalancing mechanism and the indicating device of my invention;

Figure II is a fragmentary elevational view of a chart and a slightly modified form of indicating means of my invention; and Figure III is an enlarged detail elevational view of another form of the indicating hand of my invention.

Referring to the drawings in detail, I have only illustrated the load-offsetting and indicating means of a scale, as my invention is applicable to any type of automatic scale. The load-counterbalancing and indicating mechanism is supported within a watch-case-shaped housing 1 upon an upright frame 2 fixed to the housing. The fulcrum sectors 3 forming parts of the load-counterbalancing pendulums 5 are supported from the pillar portions 4 of the frame 2 by means of flexible metallic bands or ribbons 6 which overlie the outer parallel vertical faces of the pillars 4. Rigidly connected to the respective pendulums 5 and fulcrum sectors 3 are power sectors 8, from which depend a pair of metallic ribbons 9, the lower ends of the ribbons being connected to an equalizer 10, the latter being in turn connected by any suitable means to a platform lever mechanism or platform (not shown).

Pivotally connected to the fulcrum sectors 3 on an axis passing through the center about which the arcuate faces of the sectors are curved is a compensating frame 11 which moves vertically as the pendulums 5 swing outwardly and upwardly to counterbalance the load upon the scale platform, the frame 11 being suitably connected through rack and pinion mechanism (not shown) to an indicating element 12 which is adapted to co-operate with a graduated chart 13 fixed in the housing 1. The indicating element 12 is provided with a graduated sector 14 which is substantially identical with a portion of the chart with which it co-operates.

In the use of my invention no manipulation of mechanism or loose weights is necessary. The containers, which have been pre-weighed and the weight of each marked thereon, may be filled with the commodity before they are brought to the scale, or they may be filled while upon the scale platform.

When the empty container is placed upon the scale platform the scale has been so adjusted and sealed that the graduation on the indicating hand 14 registering with the zero graduation on the chart 13 corresponds to the weight of the container. The graduation corresponding to the tare weight is thus selected as a pointer. When the container has been filled with the desired commodity, the net weight thereof is indicated by the graduation on the chart 13 in registration with a graduation on the indicating hand corresponding to the weight marked upon the container. For example, in packing crackers the weight of the containers and the size of the crackers vary and the resulting net weights are not uniform. Thus, if a container having a weight of 3 lbs. be placed upon the scale platform, the graduation indicated by the figure 3 on the indicator hand will register with the zero mark on the chart. Then enough crackers are introduced to fill the container. If the net weight of the crackers be, for example, 5 lbs., the graduation on the chart 13—i. e., 5 lbs.—in registration with the 3 lb. mark on the indicating hand represents the net weight of the crackers, such a position of the indicator hand being shown in Figure I. In the use of my device no manipulation of mechanism or loose weights is necessary and a great saving of time is effected in packing operations.

The scope of the graduated portion of the indicating hand may be such as to include and take care of all variations in weight of the containers of a like kind, the graduations shown on the hand in Figure I being capable of indicating the weights of containers ranging between 3 and 7 lbs.

In the modification illustrated in Figure II the chart and indicator hand 20 and chart 21 are substantially like those hereinbefore described, with the exception that the range or scope of weight of containers that the graduated indicator hand will accommodate is from 0 to 4 lbs.

Sometimes it is desirable to bring a plurality of articles or commodities to the same weight, and an indicator such as shown in Figure III may be employed to indicate the amount of weight over or under a predetermined weight and thus enable the operator to accurately ascertain how much weight must be added or deducted to bring the commodity to the correct weight.

The embodiments of my invention herein shown and described are to be regarded as illustrative only, and it is to be understood that the invention is susceptible to variation, modification and change within the spirit and scope of the subjoined claims.

Having described my invention, I claim:

1. In a predetermined weight weighing device, in combination, automatic weighing mechanism, and indicating mechanism including a hand bearing graduations connected to said weighing mechanism, one of the graduations on said hand being of distinctive form and thereby adapted to act as a pointer, said hand co-operating with a graduated chart whereby the other graduations on said hand are adapted to indicate variations in weight of commodities from a predetermined standard corresponding to the value of one of the graduations on said chart.

2. In a device of the class described, in combination, automatic weighing mechanism, an indicator hand operatively connected thereto, said indicator hand bearing a series of graduations corresponding to tare weights, and means including a chart bearing a selecting point and co-operating with the graduations on said indicating hand whereby when a container is placed on said scale the graduation corresponding to the weight of such container is selected as a pointer.

3. In a device of the class described, in combination, automatic weighing mechanism, an indicator hand operatively connected thereto, said indicator hand bearing a series of graduations corresponding to tare weights, means including a chart bearing a selecting point and co-operating with the graduations on said indicator hand whereby when a container is placed on said scale the graduation corresponding to the weight of such container is selected as a pointer, said chart bearing a series of net weight graduations for co-operation with a selected graduation on said indicator hand, whereby the net weight of a commodity placed in said container is indicated by said graduation selected as a pointer.

4. In a device of the class described, in combination, automatic weighing mechanism, and indicating mechanism connected thereto including an indicator hand bearing a series of graduations, said weighing mechanism adapted to counterbalance containers and commodities therein, said indicating hand adapted to co-operate with a graduated chart to indicate net weights.

FOSTER V. WALTZ.